US006606378B1

(12) United States Patent
Madoch et al.

(10) Patent No.: US 6,606,378 B1
(45) Date of Patent: *Aug. 12, 2003

(54) METHOD AND NETWORK FOR PROVIDING ACCESS TO AN INFORMATION NETWORK

(75) Inventors: Pitsa Madoch, Glenview, IL (US); Richard Peter Ericson, Park Forest, IL (US); Robert John Laitman, LaGrange, IL (US)

(73) Assignee: SBC Technology Resources, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/382,913

(22) Filed: Aug. 25, 1999

Related U.S. Application Data

(63) Continuation of application No. 08/761,661, filed on Dec. 6, 1996.

(51) Int. Cl.[7] .......................... H04M 7/00; H04L 12/66
(52) U.S. Cl. ................... 379/220.01; 370/352
(58) Field of Search .......... 379/220.01, 221.01–221.15, 379/207.01–207.16, 201.01–201.12, 229, 230; 370/352, 537, 538, 540, 493–495, 235; 709/217–219, 203

(56) References Cited

U.S. PATENT DOCUMENTS

| | | | | |
|---|---|---|---|---|
| 4,658,398 A | * | 4/1987 | Hsing | 379/202 |
| 4,899,337 A | * | 2/1990 | Hirai | 370/428 |
| 5,054,021 A | * | 10/1991 | Epps | 379/202 |
| 5,436,957 A | * | 7/1995 | McConnell | 379/196 |
| 5,479,399 A | * | 12/1995 | Grabenhorst et al. | 370/391 |
| 5,533,112 A | * | 7/1996 | Danneels | 379/202 |
| 5,634,015 A | * | 5/1997 | Chang et al. | 710/129 |
| 5,790,548 A | * | 8/1998 | Sistanizadeh et al. | 370/401 |
| 5,793,857 A | * | 8/1998 | Barnes et al. | 379/207 |
| 5,805,587 A | * | 9/1998 | Norris et al. | 370/352 |
| 5,878,117 A | * | 3/1999 | Minakami et al. | 379/88.01 |
| 5,907,602 A | * | 5/1999 | Peel et al. | 379/114 |
| 5,917,899 A | * | 6/1999 | Moss et al. | 379/220 |
| 5,933,490 A | * | 8/1999 | White et al. | 379/221.01 |
| 5,987,111 A | * | 11/1999 | Madoch et al. | 379/220.01 |
| 5,995,605 A | * | 11/1999 | Madoch et al. | 379/201 |
| 6,198,749 B1 | * | 3/2001 | Hui et al. | 370/463 |
| 6,304,567 B1 | * | 10/2001 | Rosenberg | 370/352 |

* cited by examiner

*Primary Examiner*—Benny Q. Tieu
(74) *Attorney, Agent, or Firm*—Law Office of Dale B. Halling (57) ABSTRACT

An intelligent network for providing access to a computer network (80) has a number of central office switches (64, 82). Each central office switch (64, 82) is capable of receiving a call to a centrex telephone number and transmitting a query. A service control point (70) is coupled to the central office switches (64, 82) by a SS7 signal link (66). The service control point receives the query and transmits a response to the central office switch (64, 82). A hub switch (75) is coupled to the central office switches (64, 82) and receives the call. The hub switch (75) contains a digital trunk service (76) that combines the call with a number of other calls to form a data stream. The data stream is then transmitted to a computer network node (80).

12 Claims, 8 Drawing Sheets

METHOD AND NETWORK FOR PROVIDING ACCESS TO AN INFORMATION NETWORK

This is a continuation of application Ser. No. 08/761,661, filed Dec. 6, 1996.

FIELD OF THE INVENTION

The present invention relates generally to the field of telecommunications and more particularly to a method and network for providing access to a computer network.

BACKGROUND OF THE INVENTION

Information and Enhanced Service Providers (ISP/ESP) provide access to computer networks, such as the internet and America Online Network. A small customer, such as an individual, contracts with an ISP (or ESP) to provide access to the internet. The customer has his modem call the ISP's telephone number. The customer's modem then establishes a communication link over the public switched telephone network with the ISP's modem. Once the communication link has been established, the ISP can connect the customer to electronic mail services, the world wide web and a variety of other services.

Internet Service Providers (ISP) require a large number of incoming telephone lines for their customers (subscribers). Today ISPs generally create a number of mini-points of presence (POPs) that can terminate a large number of telephone calls. Terminating equipment must be purchased for a number of locations. Customer calls to the ISP are routed to one of the mini-POPs and terminating by the terminating equipment. The terminating equipment is expensive and must be maintained by the ISP. In addition, if the ISP wishes to increase the number of incoming lines, this requires the purchase of additional terminating equipment.

Thus there exists a need for a method and network that overcomes these and other problems.

DETAILED DESCRIPTION OF THE DRAWINGS

Figure 1:
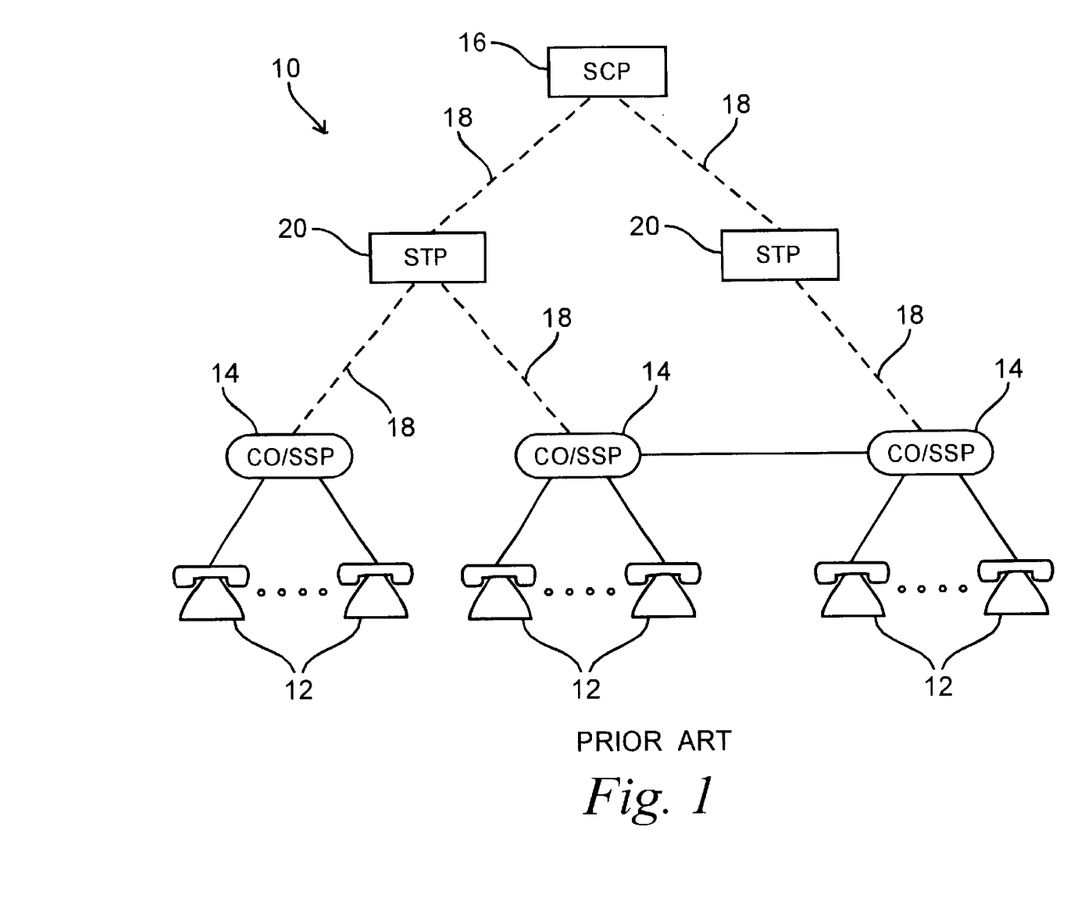
FIG. 1 is a block diagram of an advanced intelligent network.

The invention uses some of the features of an advance intelligent network to provide the ISP the functionality of a mini-POP without the cost and maintenance problems of a mini-POP. A brief discussion of the advanced intelligent network 10, shown in FIG. 1, will be helpful in understanding the invention. The idea behind the advanced intelligent network 10 is to separate the "intelligent" features from the switching. A plurality of telephones 12 are connected to a plurality of central office—service switching points (CO\SSP) 14. A standard telephone call within an LATA (Local Access and Transport Area) is switched at a CO\SSP 14 to the appropriate destination, without any additional processing. A call invoking a special feature, such as incoming and out-going call control or caller ID with name, require processing by a service control point (SCP) 16. A SCP 16 is a computer and memory system that contains routing, billing and other information. Calls to a number having incoming call control are detected at the CO\SSP 14 as requiring additional processing. This is called a trigger, and call processing is interrupted while the CO\SSP 14 transmits a query to the SCP 16, requesting information on how to route the call. The query is carried over a signal system 7 (SS7) signal link 18 and routed to the appropriate SCP 16 by a signal transfer point (STP) 20. The STP 20 performs global title translation on the incoming query and routes the query to the appropriate SCP 16. Once the SCP 16 receives the query, it formulates a response containing the routing information, and transmits it to the requesting CO\SSP 14. The CO\SSP 14 then continues the call processing by switching the call to the appropriate destination.

Figure 2:
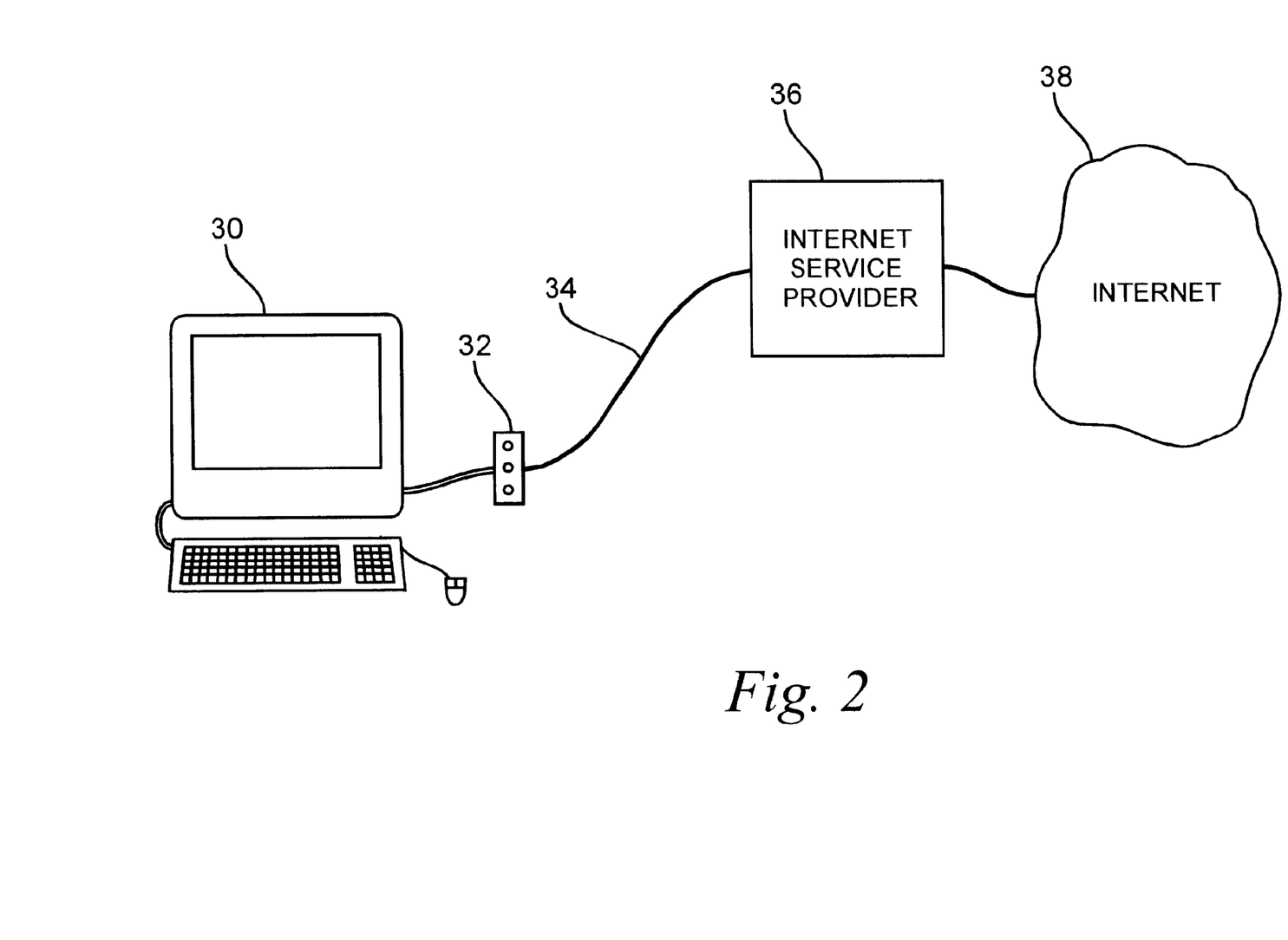
FIG. 2 is a schematic diagram of an computer network service connection.

FIG. 2 is a schematic diagram of an internet access system. A customer uses communication software on his computer 30 to direct his modem 32 to establish a communication link. The communication link uses a standard telephone line 34 connecting the customer's modem 32 to an internet service provider 36. Once the communication link is established the internet service provider 36 provides the customer access to the internet 38. The customer can then connect to services such as electronic mail, newsgroups and the world wide web.

Figure 3:
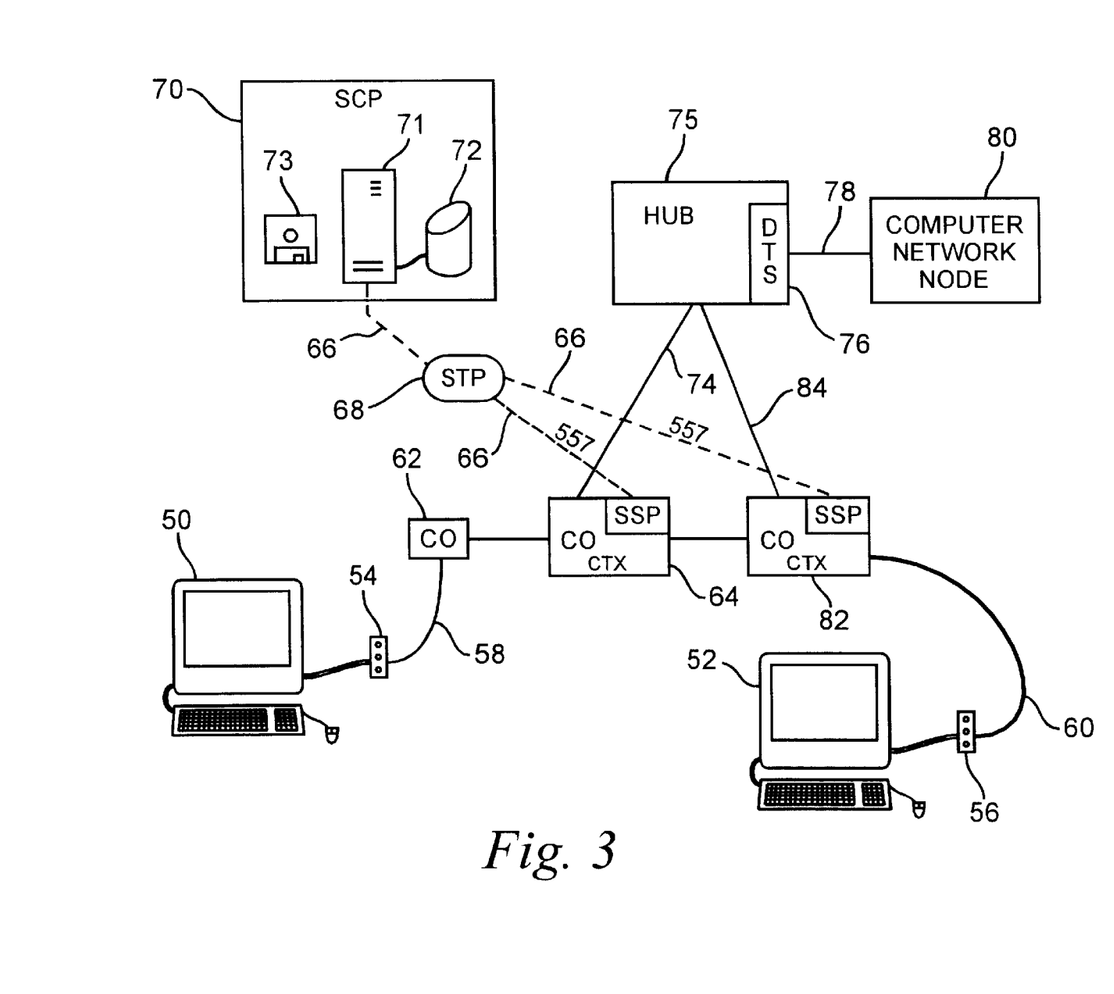
FIG. 3 is a block diagram of a network for providing access to a computer network node.

FIG. 3 is a block diagram of an intelligent network for providing access to a computer network node (e.g., internet, AOL). A computer 50, 52 has a modem 54, 56 connected to a telephone line 58, 60. When the modem 54 calls a centrex (ctx) telephone number belonging to the ISP, a central office switch 62 connects the modem 54 to a second central office switch (plurality of central office switches) 64 having the centrex telephone number. The second central office switch 64 is a SSP and upon receiving a call to one of the plurality of centrex telephone numbers, the SSP interrupts call processing and launches a query. The query is routed by a signal system 7 (SS7) 66 to a STP 68. The STP 68 routes the query to a SCP 70. The SCP 70 transmits a response to the CO\SSP 64 that contains a routing instruction and a billing instruction. The SCP 70 is a large computer 71 having a large memory 72 that contains routing, billing and other special instructions. The SCP 70 can be programmed to provide a variety of services. A computer-readable storage medium (hard drive, tape drive, etc.) 73 can be used to store programs (computer-readable instructions) to implement various services by the SCP, such as the service of this invention.

The routing instruction causes the CO\SSP 64 to forward the call along one of a plurality of call forwarding paths 74 to a hub switch 75. The hub switch 75 includes a digital trunking service (DTS) 76 that combines the forwarded call with a plurality of other calls to the plurality of centrex numbers to form a data stream. The digital trunking service 76 formats the data in a twenty four channel 1.544 Mbps format or an Integrated Services Digital Network (ISDN) primary rate interface service format. The hub switch also measures the usage (centum call seconds, line-time usage) of the data stream. The data stream is carried by a dedicated trunk 78 to the computer network node 80. For an internet provider the computer network node (computer network access node) 80, would be the ISP's internet access point. In another embodiment, the computer 52 calls one of the plurality of centrex numbers selected by the ISP. The modem 56 establishes a communication link with CO\SSP 82 without having to switch through another CO. The CO\SSP 82 performs the same functions as the CO\SSP 64 and forwards the call to the hub over a digital trunk 84 that connects the hub switch to the CO\SSP 82.

Figure 4:
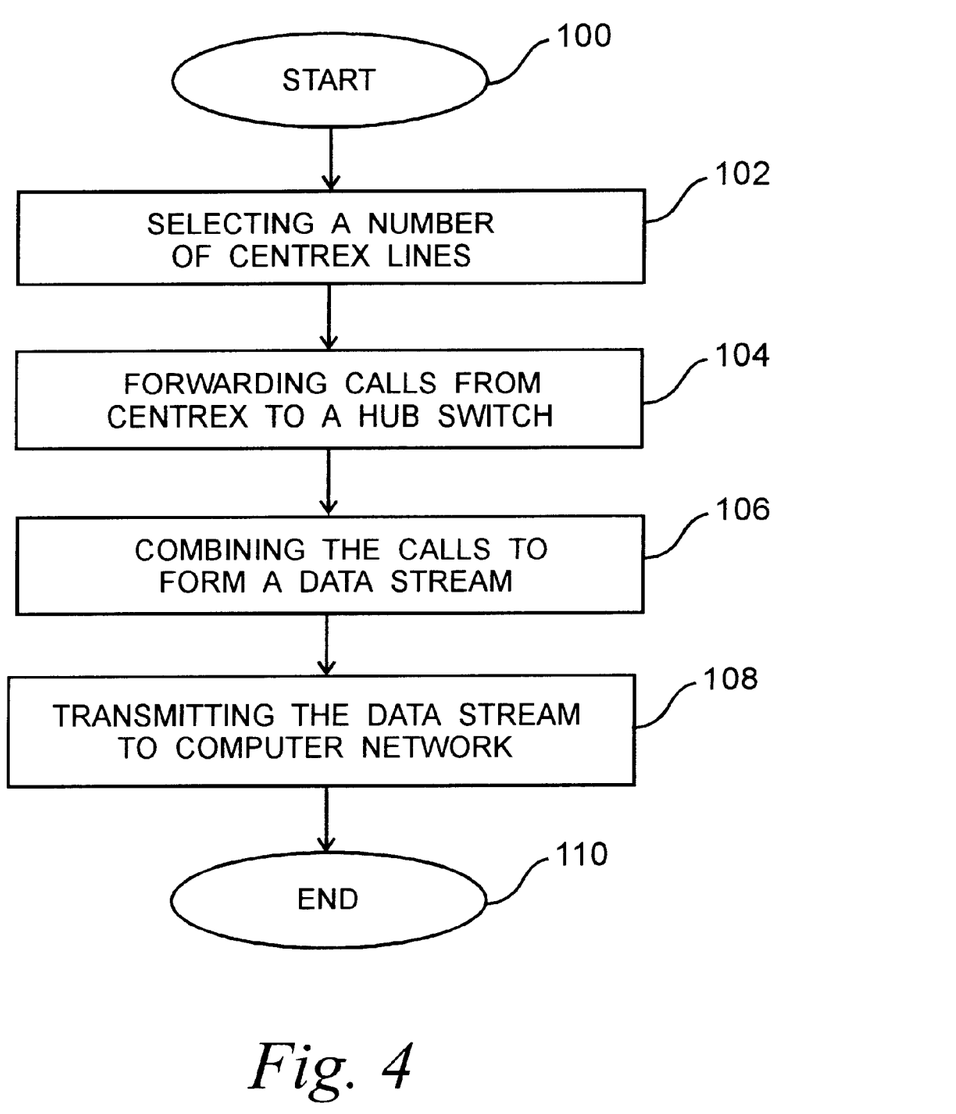
FIG. 4 is a flow chart of an embodiment of a method of providing access to a computer network.

FIG. 4 is a flow chart of an embodiment of the process implemented by the intelligent network of FIG. 3. The process starts, step 100, by selecting a number of centrex lines (centrex numbers) at step 102. These centrex numbers are the numbers an ISP's customers call to obtain access to the ISP/internet. A plurality of calls to one of the plurality of centrex numbers are forwarded to the hub switch at step 104. The call is then combined with a plurality of other calls to the plurality of centrex numbers to form a data stream at step 106. The data stream is transmitted over a dedicated trunk to a computer network, at step 108, which ends the process at step 110.

Figure 5:
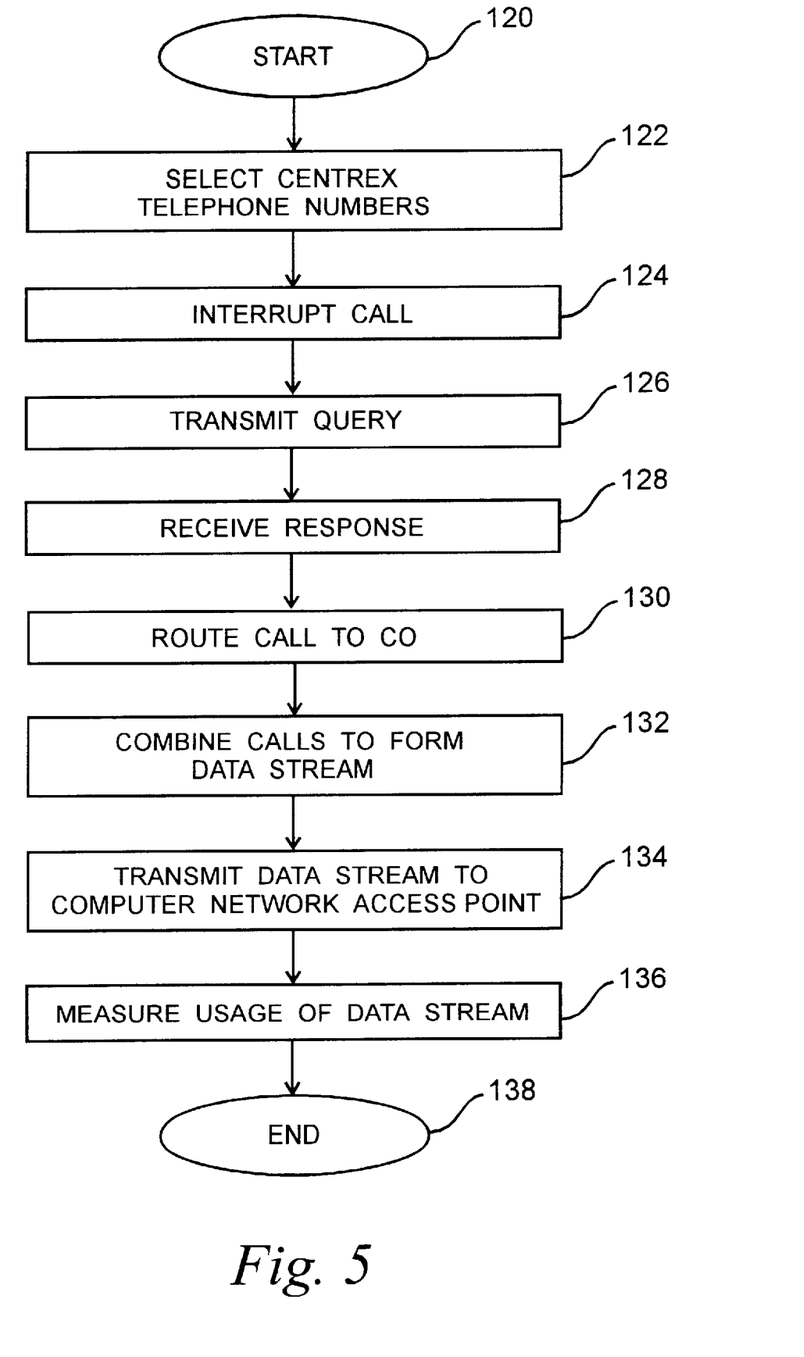
FIG. 5 is a flow chart of another embodiment of a method of providing access to a computer network.
Figure 6A:
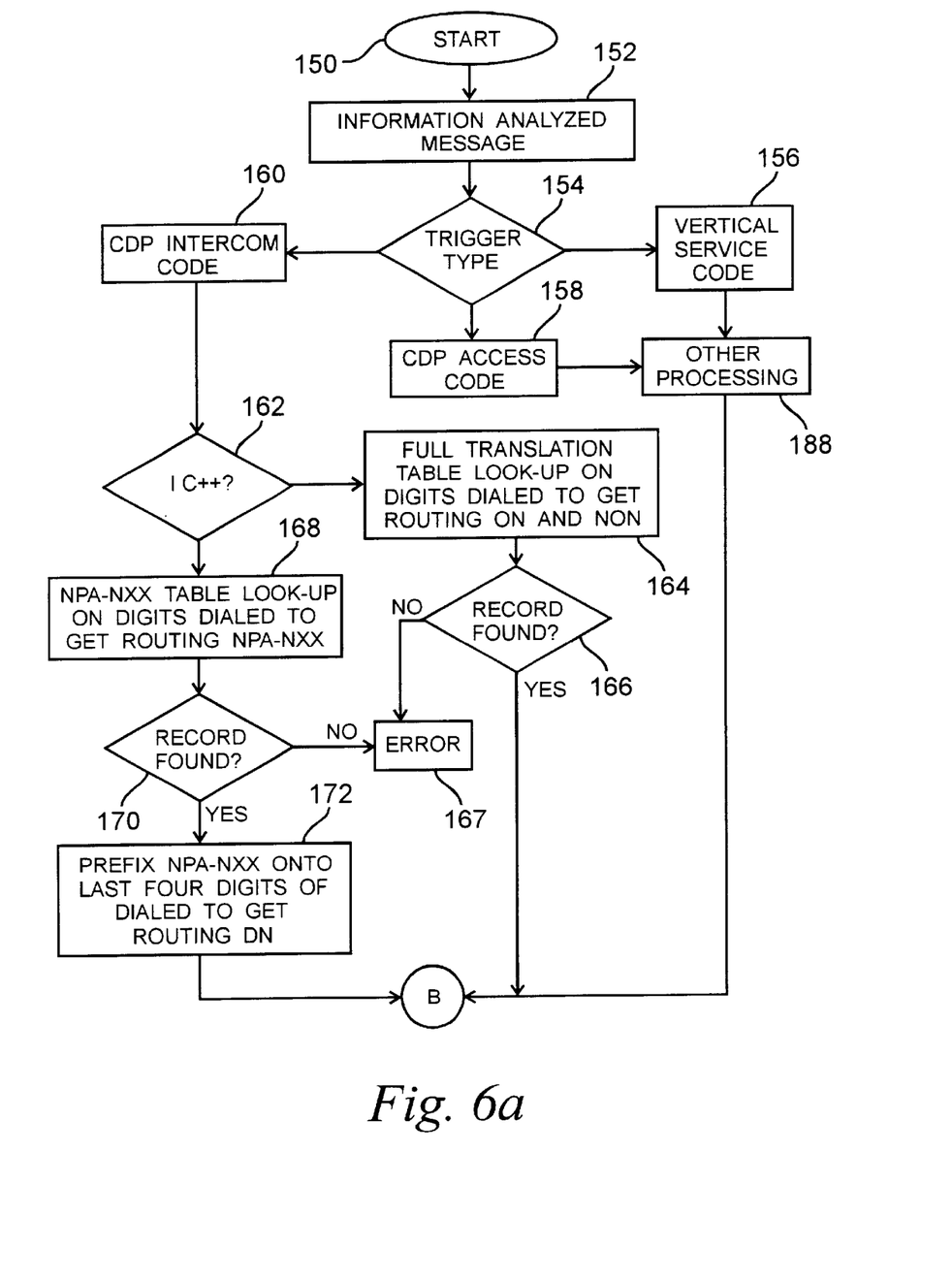
FIGS. 6a–c are a flow chart of the steps a service control point executes to generate a response.
Figure 6B:
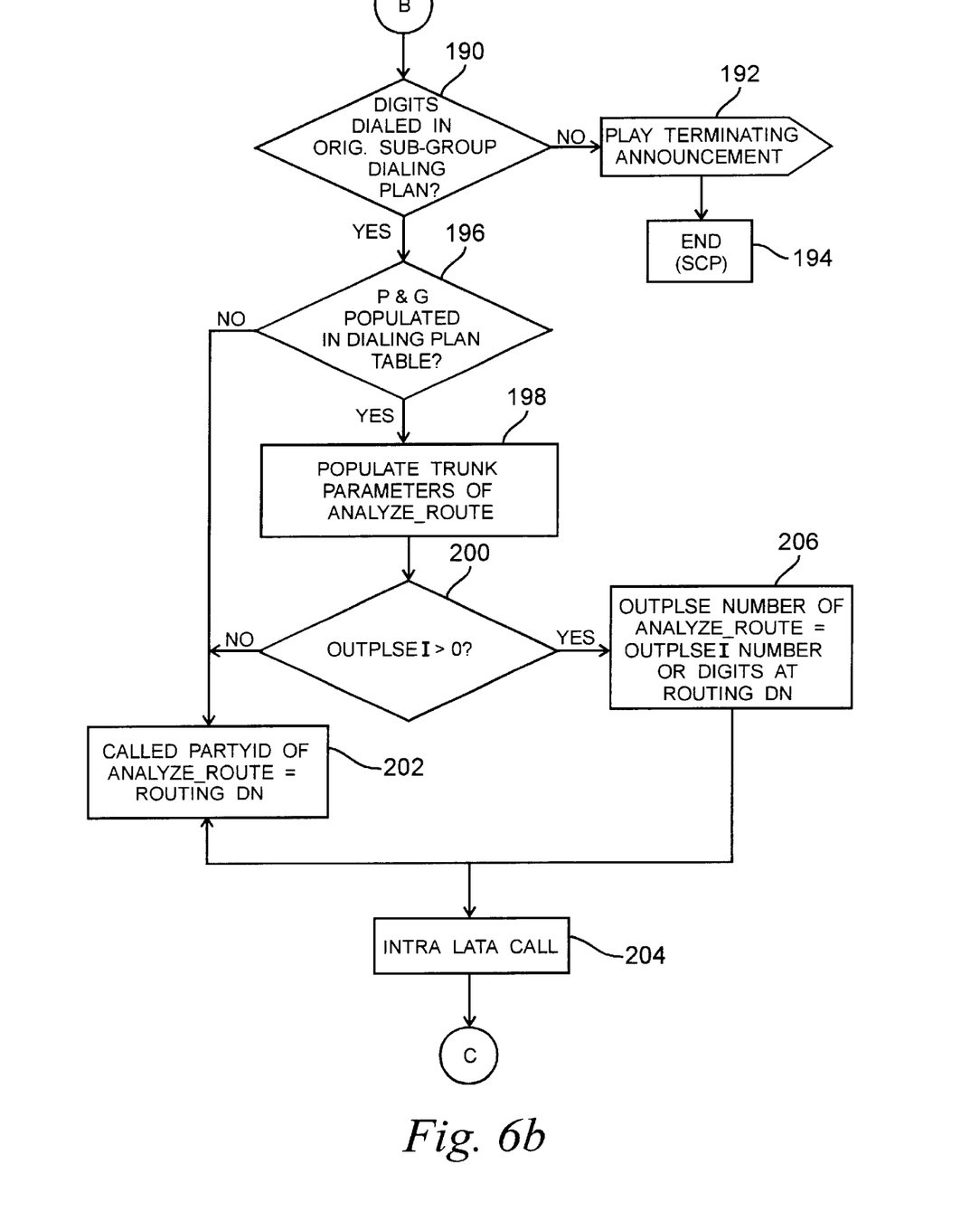
Figure 6C:
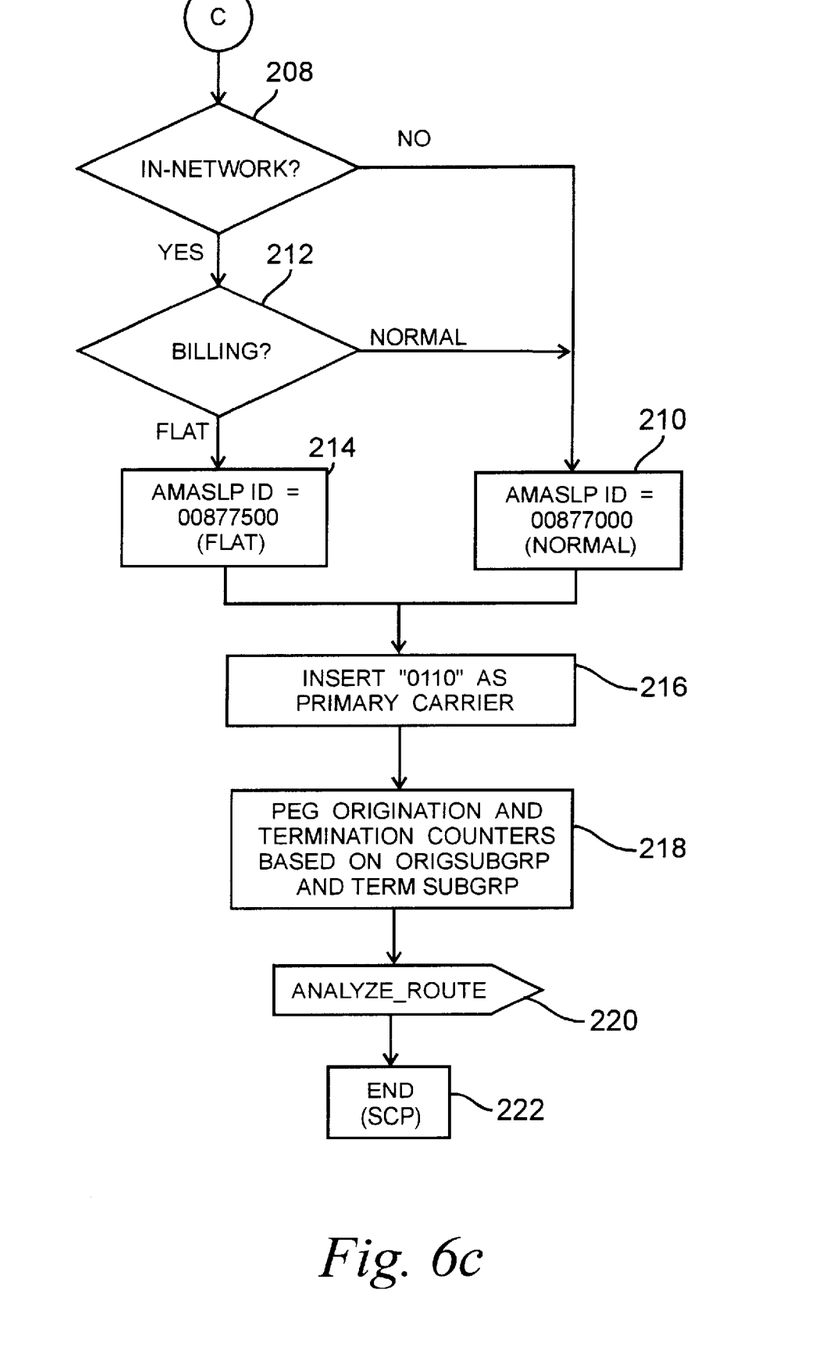

FIG. 5 is another embodiment of the process of providing access to a computer network. This process can be embodied in a software program that is executed by the intelligent network. The process starts, step 120, by selecting a plurality of centrex lines (numbers) at step 122. A call to one of the plurality of centrex numbers is interrupted by the CO\SSP at step 124. A query is transmitted from the CO\SSP to a SCP at step 126. A response is received from the SCP at step 128. The response includes a routing instruction and a billing instruction. At step 130 the call is routed to the hub switch based on the routing instruction. A digital trunking service at the hub switch combines the call with a plurality of other calls to form a data stream at step 132. The data stream is transmitted to a computer network access node at step 134. The usage of the data stream is measured according to the billing instruction at step 136, which ends the process at step 138.

Using the process described above an ISP no longer needs to buy terminating equipment at a plurality of locations or to dedicate terminal equipment to support each site. A plurality of additional lines can be added by adding a single centrex number. Since the calls are routed to a hub switch and digital trunking service utilization improvements are realized through the hub\CO switch and the ISP no longer has to maintain equipment at multiple locations. Thus there has been described a network and method of providing access to a computer network, that reduces maintenance and capital costs.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A method of providing access to an information network, comprising the steps of:
   (a) selecting a plurality of centrex numbers;
   (b) aggregating a plurality of calls, placed to one of the plurality of centrex numbers, to form a data stream; and
   (c) transmitting the data stream to an information network access node.

2. The method of claim 1, wherein step (b) further includes the step of:
   (b1) forwarding the plurality of calls, placed to one of the plurality of centrex numbers, to a hub switch.

3. The method of claim 2, further including the step of:
   (b2) combining the plurality of calls to form the data stream.

4. The method of claim 2, further including the steps of:
   (i) triggering on one of the plurality of calls placed to one of the plurality of centrex numbers;
   (ii) transmitting a query to a service control point.

5. The method of claim 4, further including the steps of:
   (iii) receiving a routing instruction from the service control point.
   (iv) routing the one of the plurality of calls based on the routing instruction.

6. An intelligent network for providing access to an information network comprising:
   a plurality of central office switches capable of receiving a call to one of a plurality of telephone numbers and transmitting a query;
   a service control point coupled to the plurality of central office switches by a signaling system seven signal link, the service control point receiving the query and transmitting a response;
   a hub switch coupled to the plurality of central office switches, the hub switch receiving the call to one of the plurality of telephone numbers and aggregating the call with a plurality of other calls to form a data stream; and
   an information network node coupled to the hub switch and receiving the data stream.

7. The intelligent network of claim 6, further including a digital trunk service connecting the information network node to the hub switch.

8. The intelligent network of claim 6, further including a plurality of call forwarding paths connecting the plurality of central office switches to the hub switch.

9. A method of providing access to an information network, comprising the steps of:
   (a) aggregating a plurality of calls, to form a data stream;
   (b) transmitting the data steam to a computer access point; and
   (c) measuring a usage of the data stream.

10. The method claim 9, wherein step (a) further includes the step of:
    (a1) selecting a plurality of lines.

11. The method of claim 10, further including the step of:
    (a2) forwarding a plurality of calls, placed to one of the plurality of lines, to a hub switch.

12. The method of claim 11, further including the step of:
    (a3) combining the plurality of calls to form a data stream.

* * * * *